(No Model.)

R. V. JONES.
MEAT CUTTER.

No. 430,316. Patented June 17, 1890.

Witnesses
N. S. Amstutz
R. B. Moser

Robert V. Jones, Inventor
By H. J. Fisher, Attorney

UNITED STATES PATENT OFFICE.

ROBERT V. JONES, OF CLEVELAND, OHIO, ASSIGNOR OF TWO-THIRDS TO WILLIAM A. SCHLEICHER AND FRED. C. LEHMANN, BOTH OF SAME PLACE.

MEAT-CUTTER.

SPECIFICATION forming part of Letters Patent No. 430,316, dated June 17, 1890.

Application filed March 22, 1890. Serial No. 344,924. (No model.)

*To all whom it may concern:*

Be it known that I, ROBERT V. JONES, a citizen of the United States, residing at Cleveland, in the county of Cuyahoga and State of Ohio, have invented certain new and useful Improvements in Meat-Cutters; and I do hereby declare that the following is a full, clear, and exact description of the invention, which will enable others skilled in the art to which it appertains to make and use the same.

My invention relates to meat-cutting machines of the variety having spirally-fluted force-feed cylinders, one or more, a spirally ribbed and grooved casing, and cutters at the end of the cylinders, and is an improvement on my Patent No. 391,322, dated October 16, 1888. In said patent I show one cylinder provided with revolving cutters and the other with fixed cutters, and the meat is forced through where these cutters intersect, and thence out of a single central spout or opening in the casing. In the present construction each cylinder has a separate cutting-disk working independently of the other, and a common cutter-plate is provided for both disks, in connection with which the disks have a shearing cut.

Figure 1:
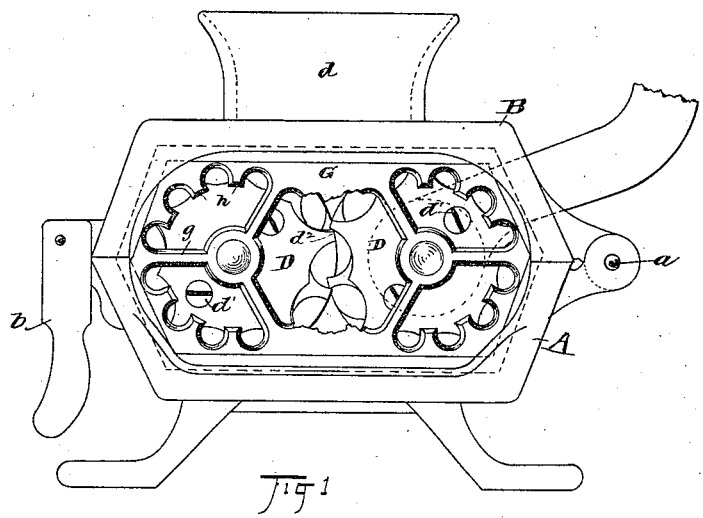
Figures 2, 5, 7:
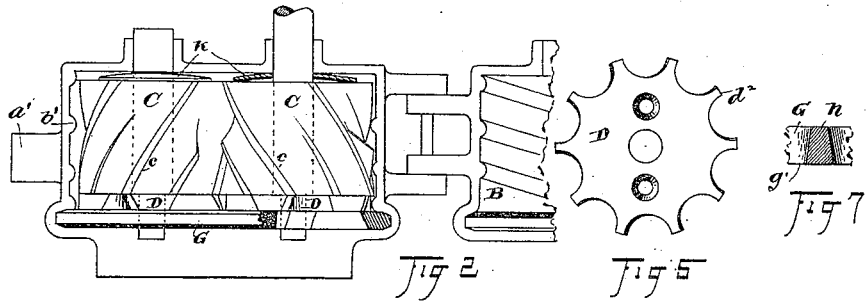
Figure 8:
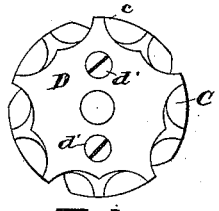
Figure 3:
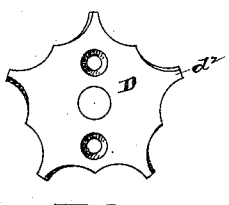
Figure 4:
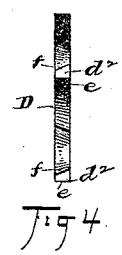
Figure 6:
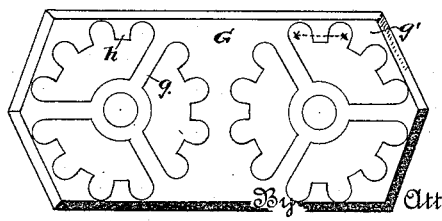

In the accompanying drawings, Figure 1 is an end elevation of the machine. Fig. 2 is a plan view of the interior of the machine with the top section of the casing removed and partly broken away. Fig. 3 is an inside view of a cutter-disk detached, and Fig. 4 is an edge view of the said disk. Fig. 5 is a view of a modification of cutting-disk designed to be used when finer work is to be done, the said disk having a greater number of cutting-teeth than the disk in Fig. 3. Fig. 6 is a side elevation of the cutter-plate, showing the inner side of said plate, the outer side of which is seen in Fig. 1. Fig. 7 is a cross-section of one of the cutter-teeth on the cutter-plate, line $x\,x$, Fig. 6. Fig. 8 is an end view of one of the cylinders with a cutting-disk attached.

The construction of the casing with its ribs and intermediate grooves or channels arranged to feed toward one end, and the spirally-fluted cylinders acting therewith to force the meat forward to the cutters, I do not claim as new, and they form no part of this invention, except as they co-operate and combine with other and distinctly novel parts.

A is the lower half or section of the shell or casing carrying the feed-cylinders, and B is the upper half or section. These parts are suitably hinged together at $a$, and fastened together at the opposite side by a pivoted strap or catch $b$, engaging a lug $a'$ on the lower section, or by equivalent means. Both sections have feed-ribs $b'$ within, tending toward the discharge end of the casing and co-operating with the cylinders C in forcing the meat forward with a uniform pressure at all points upon and through the cutters. The spiral ribs $c$ of the cylinders mesh or interlock, so that one is driven from the other, and the said ribs are so arranged that they co-operate in conveying the meat forward away from the feed-spout $d$ toward the cutting-knives. However, if a single cylinder be used in a suitably-constructed casing, the feeding will be effective and sufficient through the joint action of the cylinder and the ribs on the casing.

At the end of each cylinder is a cutting-disk D, provided with a central opening fitting over the journal of the cylinder, and screw-holes through which it is detachably attached to the cylinder by screws $d'$. This cutter disk or blade has teeth $d^2$ projecting from its edge, so as to be even with the edge of the ribs $c$ on the cylinder, with which ribs they are designed to match, so as not to obstruct the passage of the uncut body of meat approaching the cutters between the said ribs $c$. The number of teeth $d^2$ on a disk is governed by the fineness to which the meat is to be cut, and a modification of construction in this particular is shown in Fig. 5, which shows more teeth than Fig. 3, and hence is capable of finer work. The disks D lie flat against the flat end of the cylinder, so that when they are in position a perfectly-close connection is made and there is no room for meat or juice to work between. The scallops between the teeth correspond to the space between the ribs $c$ of the cylinders, thus giving clearance to the meat. These scallops, as clearly seen in Figs. 3 and 4, are cut at different angles to the plane of the disk, and in said figures two such different scallops appear between each set of teeth. Thus one $e$ is practically at right angles to the outer face of the disk, while the other $f$ is at an acute angle, so as to form a sharp cutting-edge along the outer surface of the disk. The edge at $e$ may, however, be more or less inclined either way, as well as curved, or be otherwise fashioned, with the precaution not to obstruct the passage for the meat; but the edge at $f$ necessarily is beveled inward and downward to get the cut required. The same construction, substantially, is made in a single scallop in Fig. 5, where the cutter is shown with as many teeth as there are ribs $c$ on the cylinder. In any event the shearing cut is essential, and this means a sharp edge working in conjunction with the cutter-plate.

G represents the cutter-plate set in a groove formed in the two sections of the casing in such position that when the said blade is in working position it fits snugly against the outside of the cutting-disks. The outer edge of this plate is beveled to cause it to set tightly and firmly in its seat in the upper and lower sections of the casing, and is provided with bearings for the journals of the cylinders C, supported on radiating arms $g$. Excepting the space occupied by these arms and the short teeth $h$, the said plate is absolutely open over the entire space covered by the ends of the cylinders. An annular open space is thus formed at the ends of the feed-cylinders through the cutting-plate, and around this opening are short teeth $h$, corresponding in depth to the depth of the teeth $d^2$, the said teeth $d^2$ and $h$ overlapping each other somewhat, so as to do absolutely perfect work.

The number of teeth $h$ in the plate G may be varied just as in the cutting-disks D, and the radiating arms $g$ are fashioned to perform the functions of the teeth $h$. Were it not for the need of forming bearings for the cylinders at this end, the arms $g$ would not be needed and teeth $h$ would take their place.

In Fig. 6 the inner side $g'$ of the cutter-plate is shown, a cross-section of one of said teeth being seen in Fig. 7. All of said teeth are alike beveled from the inner to the outer surface, as seen in Figs. 1 and 7, so as to form a sharp cutting-edge to match the cutters D. The space between the teeth $h$ is shown as circular; but the teeth may be cut like common saw-teeth or in any other style, provided they are formed to cut as herein described.

It will be seen by the foregoing description and the drawings that in this machine the meat, as it is forcibly fed down the grooves of the cylinders to the cutters, is subjected only to a cutting action very similar to the action of chopping on a block, and the product of the machine resembles block-cut meat—that is, there is no grinding or tearing of the meat, no squeezing through small holes, producing shreds and strings and making it smeary or pasty, but a steady forward feed to knives that give a square clean cut like an old-fashioned chopper. The operation also is a very easy one and more rapid as well as more effective than I have ever witnessed in any other machine of equal size. Any desired size of machine may be made on this principle and the power be by hand or otherwise.

A concavo-convex washer-spring K is fixed on the spindle of the cylinder inside the case at the end of the cylinder opposite the end on which the cutting-disk is fixed, which serves to press the cylinder with its cutting-disk against the cutter-plates, substantially as described.

It will be observed that the cutting-disks secured upon the ends of the feed-cylinders being set flatly and snugly against the ends of said cylinders, the functions substantially as shown and described form a continuation of the feed from said cylinders through the cutters, the scallops in the cutting-disk being arranged, as hereinbefore described, to match the grooves between the ribs of the cylinders for this purpose. This makes the cylinder and the cutting-disk attached thereto practically one part or piece so far as the feeding forward of the meat is concerned, while at the same time the disk is so constructed as to form a cutter. It will also be observed that the cutting-disks mesh with one another the same as the feed-cylinders, and inasmuch as this occurs and they completely occupy the space within the outside cutting-plate and the ends of the cylinders there is no room for the catching and lingering of the strings of the meat, as is liable to occur in machines of this character; but the strings as they appear are caught between the sharp edges of the cutting-disks and are severed, so that when they pass through the cutters of the meat they are cut up finally and disappear.

The further fact may be mentioned that this machine feeds cleanly—that is, by continuing the turning the meat contained therein may be fed and forced almost absolutely all out of the cutting-disk, and practically none remains within the cylinder to be removed when the cutting ceases.

Again, there are very few parts, and those that are are easily accessible and easily cleaned, and it takes but a moment to take the machine apart or to put it together.

Having thus described my invention, what I claim as new, and desire to secure by Letters Patent, is—

1. In a meat-cutting machine, the feed-cylinder having longitudinal ribs and a cutter-disk attached to said cylinder with teeth set opposite to said ribs, and a fixed cutter-plate outside the cutter-disk, substantially as described.

2. In a meat-cutting machine, a feed-cylinder and a fixed cutter-plate having an annular opening opposite the end of the cylinder, and a series of teeth around said opening, and a cutting-disk fixed on the end of the cylinder, substantially as described.

3. In a meat-cutting machine, a feed-cylinder having spirally-arranged ribs and a flat end, in combination with a cutter-disk having teeth fastened upon said flat end of the cylinder and its teeth set in alignment with the ribs thereon, substantially as described.

4. A cutter-plate for a meat-cutting machine formed with an annular opening, and a series of inwardly-projecting teeth around said opening beveled outwardly from their cutting-edge, substantially as described.

5. The shell or casing and the cylinder constructed to feed the meat forward to the cutters, in combination with a cutting-disk fixed on the end of the cylinder and having teeth on its periphery, and a cutter-plate set in the end of the casing and having a circular row of teeth matching the teeth on the cutter-disk, substantially as described.

6. In a meat-cutter, the two sections hinged together and each provided with part of a seat at their open ends for the cutter-plate, and a cutter-plate set in the lower section and held in position by the upper section, substantially as described.

Witness my hand to the foregoing specification this 4th day of March, 1890.

ROBERT V. JONES.

Witnesses:
H. T. FISHER,
N. S. MCLANE.